US007340680B2

(12) United States Patent
Becker

(10) Patent No.: US 7,340,680 B2
(45) Date of Patent: Mar. 4, 2008

(54) SAP ARCHIVLINK LOAD TEST FOR CONTENT SERVER

(75) Inventor: Juergen Becker, Karlsruhe (DE)

(73) Assignee: SAP Aktiengesellschaft, Walldorf (DE)

( * ) Notice: Subject to any disclaimer, the term of this patent is extended or adjusted under 35 U.S.C. 154(b) by 680 days.

(21) Appl. No.: 10/867,109

(22) Filed: Jun. 14, 2004

(65) Prior Publication Data

US 2005/0278639 A1 Dec. 15, 2005

(51) Int. Cl.
*G06F 13/00* (2006.01)
*G06F 15/00* (2006.01)

(52) U.S. Cl. .................. 715/738; 715/737; 709/209
(58) Field of Classification Search ........ 715/735–742, 715/835–854, 760–765; 709/203, 229
See application file for complete search history.

(56) References Cited

U.S. PATENT DOCUMENTS

| 5,790,425 | A | 8/1998 | Wagle |
| 5,819,066 | A | 10/1998 | Bromberg et al. |
| 6,343,284 | B1 | 1/2002 | Ishikawa et al. |
| 6,453,269 | B1 | 9/2002 | Quernemoen |
| 6,675,214 | B2 | 1/2004 | Stewart et al. |
| 6,675,216 | B1 | 1/2004 | Quatrano et al. |
| 6,968,571 | B2 * | 11/2005 | Devine et al. ............. 726/11 |
| 7,027,046 | B2 * | 4/2006 | Zhang ..................... 345/419 |
| 2003/0191848 | A1 * | 10/2003 | Hesselink et al. ........ 709/229 |
| 2006/0168074 | A1 * | 7/2006 | Gardner et al. ........... 709/206 |

OTHER PUBLICATIONS

Banga, Gaurav and Peter Druschel, "Measuring the Capacity of a Web Server" Department of Computer Science, Rice University, 12 pages, 1997.
Banga, Gaurav and Peter Druschel, "Measuring the Capacity of a Web Server under Realistic Loads" Department of Computer Science, Rice University, 29 pages, 1999.
Azer Bestavros et al., "Application-Level Document Caching in the Internet", Boston University College of Liberal Arts, 18 pages, Jan. 15, 1995.
Greg Franks et al., "Performance Analysis of Distributed Server Systems", Department of Systems and Computer Engineering, Carleton University School of Computer Science, 12 pages, 1996.
John Heidemann et al., "Modeling the Performance of HTTP Over Several Transport Protocols", Draft, 25 pages, Jun. 6, 1997.

(Continued)

*Primary Examiner*—Cao (Kevin) Nguyen
(74) *Attorney, Agent, or Firm*—Fish & Richardson P.C.

(57) ABSTRACT

Methods and apparatus, including computer program products, for certifying a performance of a content server using a content server interface. The method includes requesting, by a test program, an address of the content server and a security key from the content server interface; receiving the address and the security key from the content server interface; writing one or more documents to the address using hyper text transfer protocol (HTTP); recording a first amount of time for the writing; requesting a retrieval of data from the content server using HTTP; receiving the data from the content server; recording a second amount of time for the receiving; and certifying the content server if the first and second amounts of time are less than predetermined thresholds.

33 Claims, 2 Drawing Sheets

OTHER PUBLICATIONS

Julian Midgley, "Benchmarking Web Servers on Linux" Zeus Technology, 19 pages, Mar. 5, 2002.

David Mosberger and Tai Jin, "httpp—A Tool for Measuring Web Server Performance", HP Research Labs, 9 pages, 1998.

Patricia B. Seybold, "FileNet P8: An Architecture for Activating Enterprise Content Integrating Content, Process, and Connectivity for Competitive Advantage", Patricia Seybold Group, 24 pages, Jun. 2003.

Norbert Schröder, "No Detours", SAP Info, http://www.sap.info/public/en/article.php4/comvArticle-193333c63b47e699dc/en, 2000.

Mark Wittle, "LADDIS: The Next Generation in NFS File Server Benchmarking", Data General Corporation, 27 pages, Apr. 1993.

Chutney Technologies, "Benchmark Results of Chutney's Application Accelerator at [Company R]", 8 pages, Sep. 2001.

IXOS Software AG, IXOS, "IXOS Document Management System", 8 pages, Feb. 2004.

Sun Microsystems, "Sun and Documentum" 19 pages, Sep. 2001.

www.documentum.com, Feb. 2004.

http://searchwebservices.techtarget.com, Mar. 11, 2002.

\* cited by examiner

SAP ARCHIVLINK LOAD TEST FOR CONTENT SERVER

BACKGROUND

The present invention relates to data processing by digital computer, and more particularly to certifying performance of hypertext transfer protocol (HTTP) content servers.

A content server is a server system that stores and retrieves content, or documents and information, for client systems. Content servers can be used for short term storage of files as well as long term archiving of files on media such as optical storage systems.

HTTP is a set of rules for transferring files such as text, graphic images, sound, video, and other multimedia files on the Internet. A web browser is an HTTP client that sends requests either to download or upload information to server systems using a network protocol such as Transmission Control Protocol/Internet Protocol (TCP/IP). For web browsing, a user downloads files for viewing information and uploads information, for example, to register an identity or purchase services or products on the Internet.

A URL (Uniform Resource Locator) is the unique address for a file that is accessible on the Internet. A common way to access a Web site is to enter the URL of its home page file in a user's web browser's address line. However, any file within that Web site can also be specified with a URL. Such a file might be any web page other than the home page, an image file, or a program such as a common gateway interface application or Java applet. The URL contains the name of the protocol to be used to access the file resource, a domain name that identifies a specific computer on the Internet, and a pathname, a hierarchical description that specifies the location of a file in that computer.

When a user of the web browser enters a request to download a file by typing in a URL specifying the Internet Protocol (IP) address of the server system, the web browser builds an HTTP "GET" request and sends it to the IP address indicated by the URL. An HTTP daemon on the server system receives the request and sends back the requested file or files associated with the request. When the user of the browser desires to upload information to the server system, the web browser receives the information from the user and sends a HTTP "PUT" or HTTP "POST" request to the server system with the information. The server system then receives and stores the information.

HTTP content servers also use HTTP for receiving and sending information to client systems. Advantages of using HTTP for content servers include that HTTP is a consistent and simple communications infrastructure designed for accessibility over the world wide web. In one example, a HTTP content server can be used to store, archive, and retrieve documents for business applications in coordination with business software designed to facilitate and automate business processes. Storing documents indicates recording the documents on non-permanent storage such as a computer hard drive. Archiving documents implies packaging the documents for backup, to transport to some other location, for saving away from the computer so that more hard disk storage can be made available, or for some other purpose. An archive can include a simple list of files or files organized under a directory or catalog structure (depending on how a particular program supports archiving). Archived documents can be stored on permanent storage such as optical drives. Examples of optical drives include Write Once, Read Many (WORM) drives, Magneto-Optical (MO) drives, and Digital Versatile Disc (DVD) drives.

Storing and archiving these business process documents is necessary for at least the following reasons: (1) internal standards for reviewing processes; (2) administration of mass data; (3) legal regulations, for example, the "duty of storage" in the German Commercial Code (HGB); and (4) optimization of business processes (e.g., multiple users in the process need access to the same documents).

In this example, one vendor can provide the HTTP content server while another vendor provides the business software. The vendors providing the HTTP content servers conform to a standard interface to HTTP content servers provided by the business software vendor. This two-vendor example generates a situation where performance of the business software, as viewed by customers, is dependent on the performance of the HTTP content server. The customers can have a high volume of documents each day to store and archive using the content server. These documents can include a high number of smaller documents and a lower number of very large documents. Thus, it is important to ensure that the two-vendor example can handle varying demand. Accordingly, there is a need for certifying a performance of the HTTP content server using a variety of benchmarking standards so that the business software vendor has a reasonable expectation that the two-vendor system will perform according to a given customer's expectations.

SUMMARY OF THE INVENTION

The present invention provides methods and apparatus, including computer program products, for certifying a performance of a content server using a content server interface.

In general, in one aspect, the invention features a method for certifying a performance of a content server using a content server interface. The method includes requesting, by a test program, an address of the content server and a security key from the content server interface; receiving the address and the security key from the content server interface; writing one or more documents to the address using hyper text transfer protocol (HTTP); recording a first amount of time for the writing; requesting a retrieval of data from the content server using HTTP; receiving the data from the content server; recording a second amount of time for the receiving; and certifying the content server if the first and second amounts of time are less than predetermined thresholds.

The invention can be implemented to include one or more of the following advantageous features. The one document is a print list. The method further includes requesting a search and retrieval by the content server in a stored print list for one or more data items; recording an amount of time to complete the search and retrieval; and determining that the content server is certified at least if the amount of time is less than a predetermined threshold. The method further includes writing one or more documents to the content server until a predetermined time period's duration expires; recording a number of the documents successfully written; and determining that the content server is certified at least if the number of the documents successfully written exceeds a threshold. Writing one or more documents to the address includes simultaneously writing a plurality of files to the content server. The method further includes requesting, from two or more clients, one or more simultaneous retrievals of a single document from documents stored on the content server; recording an amount of time to complete the one or more retrievals for each of the two or more clients; and determining that the content server is certified at least if the amount of time is less than a predetermined threshold. The stored documents are in a file cache memory of the content server. The stored documents are saved on a long term data storage device, in some examples, the data storage device is an optical data storage device.

The invention can be also implemented to include one or more of the following advantageous features. The method further includes requesting, by the test program, a search and retrieval for a data item in data archive files stored by the content server; recording an amount of time to complete the search and retrieval; and determining that the content server is certified at least if the amount of time is less than a predetermined threshold. The method further includes generating the one or more documents.

In general, in another aspect, the invention features a computer program product, tangibly embodied in an information carrier, for certifying a performance of a content server using a content server interface, the computer program product being operable to cause a data processing apparatus to request an address of the content server and a security key from the content server interface; receive the address and the security key from the content server interface; write one or more documents to the address using HTTP; record a first amount of time for the writing; request a retrieval of data from the content server using HTTP; receive the data from the content server; record a second amount of time for the receiving; and certify the content server if the first and second amounts of time are less than predetermined thresholds.

The invention can be implemented to include one or more of the following advantageous features. The computer program product is operable to further cause a data processing apparatus to request a search and retrieval by the content server in a stored print list for one or more data items; record an amount of time to complete the search and retrieval; and determine that the content server is certified at least if the amount of time is less than a predetermined threshold. The computer program product is operable to further cause a data processing apparatus to write one or more documents to the content server until a predetermined time period's duration expires; record a number of the documents successfully written; and determine that the content server is certified at least if the number of the documents successfully written exceeds a threshold. The computer program product is operable to further cause a data processing apparatus to request, from two or more clients, one or more simultaneous retrievals of a single document from documents stored on the content server; record an amount of time to complete the one or more retrievals for each of the two or more clients; and determine that the content server is certified at least if the amount of time is less than a predetermined threshold. The stored documents are in a file cache memory of the content server.

The invention can be implemented to include one or more of the following advantageous features. The computer program product is operable to further cause a data processing apparatus to request a search and retrieval for a data item in data archive files stored by the content server; record an amount of time to complete the search and retrieval; and determine that the content server is certified at least if the amount of time is less than a predetermined threshold. The computer program product is operable to further cause a data processing apparatus to generate the one or more documents.

In general, in another aspect, the invention features a system for certifying a performance of a content server using a content server interface, the system including a test program; a network configured to enable communication between the test program, the content server, and the content server interface. The test program is configured to request an address of the content server and a security key from the content server interface; receive the address and the security key from the content server interface; write one or more documents to the content server at the address using HTTP; record a first amount of time for the write; request, using HTTP, a retrieval of data from the content server; receive, from the content server, the data; record a second amount of time for the receive; and certify the content server at least if the first and second amounts of time are less than predetermined thresholds.

The invention can be implemented to include one or more of the following advantageous features. The test program is further configured to request a search and retrieval by the content server in a stored print list for one or more data items; record an amount of time to complete the search and retrieval; and determine that the content server is certified at least if the amount of time is less than a predetermined threshold. The test program is further configured to write one or more documents to the content server until a predetermined time period's duration expires; record a number of the documents successfully written; and determine that the content server is certified at least if the number of the documents successfully written exceeds a threshold. The test program is further configured to request, from two or more clients, one or more simultaneous retrievals of a single document from documents stored on the content server; record an amount of time to complete the one or more retrievals for each of the two or more clients; and determine that the content server is certified at least if the amount of time is less than a predetermined threshold. The test program is further configured to request a search and retrieval for a data item in data archive files stored by the content server; record an amount of time to complete the search and retrieval; and determine that the content server is certified at least if the amount of time is less than a predetermined threshold. The test program is further configured to generate the one or more documents.

The invention can be implemented to realize one or more of the following advantages. The performance of a HTTP content server can be certified based on a specified set of criteria. The choice of HTTP content servers from different vendors can be partly determined using the certification process.

The details of one or more implementations of the invention are set forth in the accompanying drawings and the description below. Further features, aspects, and advantages of the invention will become apparent from the description, the drawings, and the claims.

DETAILED DESCRIPTION

Figure 1:
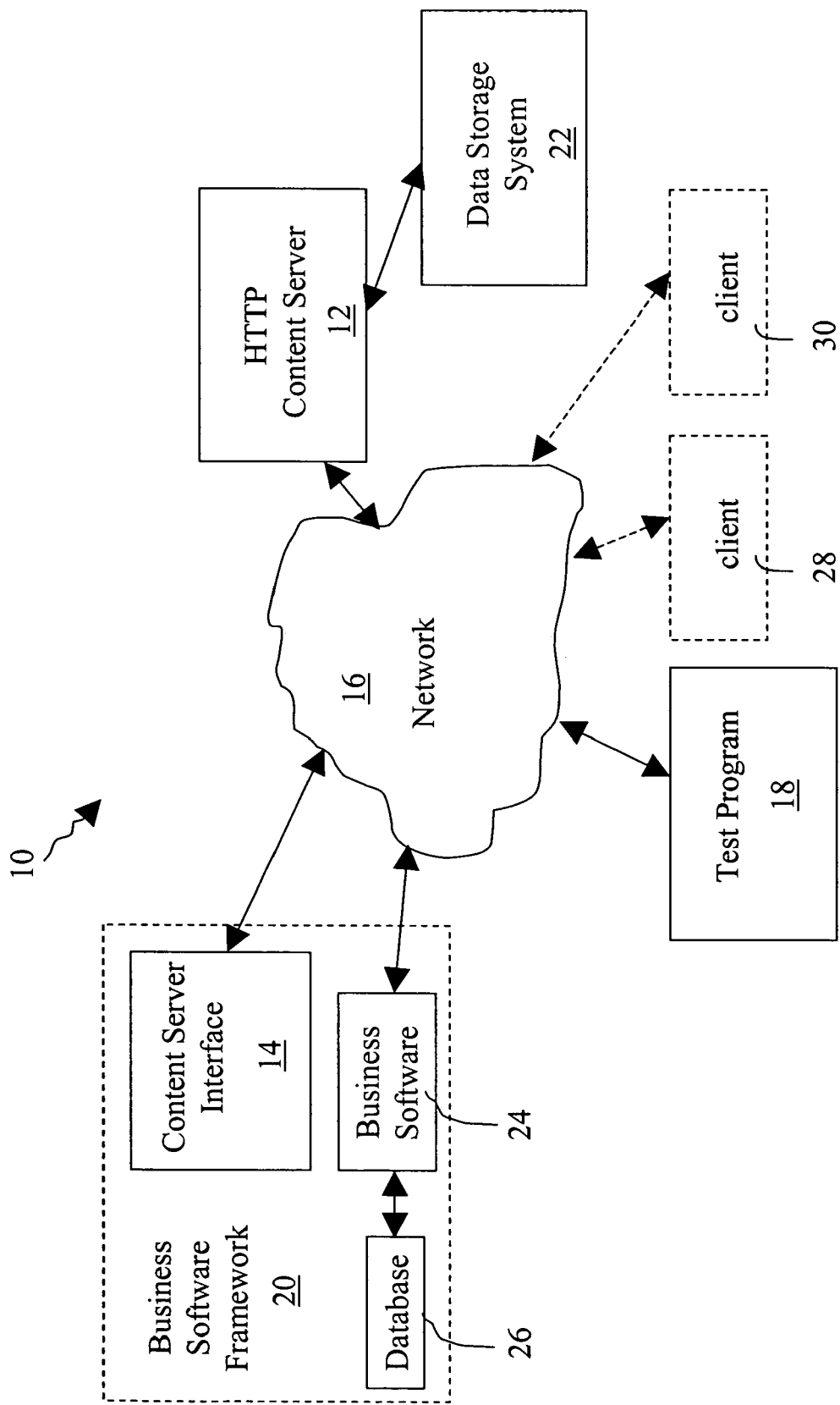
FIG. 1 is a block diagram of a business software framework and a content server.

As shown in FIG. 1, a system 10 in accordance with the invention includes a content server 12, a content server interface 14, a network 16, and a test program 18. The content server interface 14 can be part of a business software framework 20. The business software framework 20 is configured to facilitate and automate business processes. The content server 12 controls a data storage system 22 for archiving retrievable data. In examples, the data storage system 22 can record and read from a secondary cache such as an optical media. Examples of optical media include Write Once, Read Many (WORM) drives, Magneto-Optical (MO) drives, and Digital Versatile Disc (DVD) drives.

The content server 12 manages one or more content repositories for archiving on the data storage system 22, each repository managing a logical storage space for archiving documents. The business software framework 20 includes business software 24 that manages business processes. The business software 24 also manages a database 26. The test program 18 can be executed within the business software framework 20, e.g., on a same computer platform as the content server interface 14. In other examples, the test program 18 is executed on a computer platform separate from the content server interface 14. Typically, the content server 12 is executed on a computer platform different from the content server interface 14.

An example of the business software framework 20 is commercially available as the R/3 software by SAP AG of Walldorf, Baden, Germany. An example of the content server 12 is commercially available as Enterprise Content Repository by IXOS AG of Munich, Bayern, Germany.

Typically, the content server 12, upon receiving a file to be archived from the business software 24, first stores the file in a primary cache such as a local database or a file system cache. Next, the content server 12 archives the file in a secondary cache such as an optical media. After the file is archived, when the content server 12 receives a read request for the file from the business software 24, the content server 12 reads the file in the secondary cache.

Optionally, client programs 28 and 30 can be executed to provide front-end interfaces for users of business processes desiring to access documents and enter data via the business software 24. Client program 28 and 30 can be generated using Java software and can provide graphical user interfaces for the users.

Since the business processes involve documents, e.g., client records, during normal business operations, the business software 24 uses the content server 12 to store, archive, and retrieve electronic documents containing the content of these documents. It should be noted that an electronic document does not necessarily correspond to a file. A document may be stored in a portion of a file that holds other documents, in a single file dedicated to the document in question, or in multiple coordinated files.

To certify a performance of the content server 12, the test program 18 makes requests, similar to requests from the business software 24 to the content server 12, to the content server 12 to store and retrieve the electronic documents. Furthermore, the test program 18 records information about the performance of the storage and retrieval by the content server 12. This information is compared to standard thresholds to determine if the performance of the content server 12 can be certified.

For each document stored by the content server 12, the content server 12 stores administrative data that identifies and describes the document. The content server 12 also stores the content of the document. The content refers to one or more closed datasets. The administrative data identifies and describes the content. A single closed dataset is known as a content unit. A document header is an administrative entity including several components. The document header is assigned to one particular content repository of the content server 12. A component represents one particular content unit. A component is assigned to one particular document header.

The business software 24 uses the content server interface 14 to obtain signed URLs for formulating HTTP requests for storing, archiving, and retrieving the electronic documents by the content server 12. In some examples, HTTP version 1.1 is used. A signed URL indicates that the requests made using the URL are authenticated by a digital signature. The content server interface 14 stores the address of the content server 12 on the network 16. When the business software 24 is ready to make a request for storing, archiving, or retrieving an electronic document, the business software 24 requests a signed URL from the content server interface 14. The content server interface 14 authenticates the business software 24, queries the content server 12 for an open port, and returns a signed URL containing the address of the content server 12 and a port identification. This signed URL includes a security key that ensures that parameters in the signed URL cannot be changed after the parameters have been generated by the content server interface 14. Parameters that are protected in this manner include a designation of a content repository in the content server 12, an access mode, a client identification (ID) designating the business software 24, and an expiration time. These parameters are combined into the security key using a hash function. Subsequent requests from the business software 24 to the content server 12 are checked against this security key to ensure that the parameters are not changed. Access modes include rights to read, generate, change, and delete documents stored by the content server 12.

Given the address and security key for access to the content server 12, the business software 24 can send commands directly to the content server 12 via the network 16. These commands include info, get, docGet, create, mCreate, append, update, delete, search, attrSearch, putCert, and serverInfo. For each command, the business software 24 puts the command information along with the address and the security key into a HTTP request and sends the request to the content server 12.

The "info" command retrieves information about a document. The business software 24 uses the HTTP "GET" request to send the "info" command. After retrieving the information from the data storage system 22, the content server 12 responds with an "OK" response along with document information and the requested content information in an ASCII multipart/form-data format or a HTML format. In case of error, the content server 12 responds with a message indicating bad request, unauthorized, not found, conflict, internal server error, or similar language.

The "get" Command fetches (within a range) a content unit of a component of a document. The business software 24 also uses the HTTP "GET" request to send the "get" command. After retrieving the content unit from the data storage system 22, the content server 12 responds with an "OK" response along with the data of the content unit. In case of error, the content server 12 responds with a message indicating bad request, unauthorized, not found, conflict, internal server error, or similar language.

The "docGet" Command fetches the entire content of an archived document. The business software 24 also uses the HTTP "GET" request to send the "docGet" command. After retrieving the document from the data storage system 22, the content server 12 responds with an "OK" response along with the entire content of the document in multipart/formatdata format. If there is an error with the content server 12, the content server 12 responds with a message indicating bad request, unauthorized, not found, conflict, internal server error, or similar language.

The "create" command generates a new document. The business software 24 uses the HTTP "PUT" or HTTP "POST" request to send document information to the content server 12. For a document with a single component, the business software 24 uses the HTTP "PUT" request to send the document and transfers the content data as an entity body. For documents with one or more components, the business software 24 uses the HTTP "POST" request to send the document in multipart/form-data format. After the content server 12 stores the document in the primary cache of the content server 12, the content server 12 responds with a "created" response. Subsequently, the content server 12 archives the document in the data storage system 22. If an error occurs at the content server 12 while storing the document in the primary cache, the content server 12 responds with a message indicating bad request, unauthorized, forbidden, internal server error, or similar language.

The "mCreate" command generates a number of new documents. The business software 24 uses the HTTP "POST" request to send document information to the content server 12. The business software 24 uses the HTTP "POST" request to send the documents in a multipart/form-data format. After the content server 12 stores the documents in the primary cache of the content server 12, the content server 12 responds with a "created" response. Subsequently, the content server 12 archives the documents in the data storage system 22. If an error occurs at the content server 12 while storing the documents in the primary cache, the content server 12 responds with a message indicating missing documents created, bad request, unauthorized, internal server error, or similar language.

The "append" command appends data to a content unit. The business software 24 uses the HTTP "PUT" request to send appended document information to the content server 12. The business software 24 transfers the appended data as an entity body. After the content server 12 stores the document in the primary cache of the content server 12, the content server 12 responds with an "OK" response. If an error occurs at the content server 12, the content server 12 responds with a response with a message indicating bad request, unauthorized, not found, conflict, internal server error, or similar language.

The "update" command modifies an existing document. The business software 24 uses the HTTP "PUT" or HTTP "POST" request to overwrite one or more components of a document in a content repository of the content server 12. For overwriting a single component of a document, the business software 24 uses the HTTP "PUT" request in a similar manner as the command "create". For replacing a complete document with all its components, the business software 24 uses the HTTP "POST" request in a similar manner as the "create" command.

The "delete" command deletes a document or a component. The business software 24 uses the HTTP "GET" request for this command to the content server 12. After deleting the document or component from the data storage system 22, the content server 12 responds with an "OK". In case of error, the content server responds with a message indicating bad request, unauthorized, not found, conflict, internal server error, or similar language.

The "search" command searches for a text pattern within a content unit. The range of the search can be restricted to begin at one index and end at another index within the content unit. The business software 24 uses the HTTP "GET" request for this command. After searching for the text pattern in the content unit stored in the data storage system 22, the content server 12 responds with an "OK" status and the result of the search. The result is an ASCII string containing the number of hits and the offset for each hit. In case of error, the content server 12 responds with a message indicating bad request, unauthorized, not found, conflict, internal server error, or similar language.

The "attrSearch" command searches for one or more attributes within a document. For example, the "attrSearch" command can be used to search within a large file with an index such as a print list (described in more detail below). A description file stores the index. Unlike the "search" command described above, the business software 24 uses the "attrSearch" command to search in the description file of a print list. The business software 24 uses the HTTP "GET" request for this command. After searching for one or more attributes within a document stored on the data storage system 22, the content server 12 responds with an "OK" status and the result of the search. The result is an ASCII string containing the number of hits and the offset for each hit. In case of error, the content server 22 responds with a message indicating bad request, unauthorized, not found, conflict, internal server error, or similar language.

Documents stored by the content server 12 include print lists, outgoing documents, and data archiving files.

Examples of print lists include accumulated balance audit trails, batch where-used lists, project-related service specifications, balance sheet valuations, and cost center reports. Occasionally, index information is included in the print lists to enable searching for sub-objects in a particular print list. For example, if the print list is an open item account balance audit trail, a sub-object is an individual customer. For print lists, data files contain the actual data information while description files contain the index information. Print lists can be as large as two gigabytes or more and description files can be as large as twenty megabytes or more. The business software 24 can request a search by the content server 12 of a print list using its index with the command "attrSearch".

Outgoing documents are generated during execution of a business process. Outgoing documents include invoices, order confirmations, or reminders. Image documents that are automatically generated by the business software 24 are typically sent to a customer in a hard copy format, stored by the content server 12, and linked with business transactions in the business software framework 20 to keep the image documents accessible for long term references. Outgoing documents are archived by the content server 12 in the data storage system 22. The outgoing documents can be accessed easily as required and printed if necessary. The image documents can be stored in a Portable Document Format (PDF) and the documents can range in size from twenty kilobytes up to two hundred kilobytes or more. Examples of outgoing documents include customer bills that need to be archived.

Concerning data archiving files, the amount of transaction and master data in a production database (e.g., database 26) can expand rapidly during operation, often faster than technology can handle. For example, the data storage is limited by database limits, hard disk sizes, time available for backup and recovery or statistics update. By archiving the data in systems such as the data storage system 22, the database size and system performance can be managed while also ensuring that data can continue to be accessed in the long term. Data from completed business operations in the business software framework 20 that is no longer required for daily operations or accessed less frequently is copied from the database to archive files and then deleted from the database 26. Such data includes accounting and material documents, production orders, or billing documents. To take full advantage of data archiving, customers have to plan and schedule the archiving process on a regular basis. Software at the application level, e.g., the business software 24, checks that the data archived in systems such as the data storage system 22 is consistent and complete. The business software 24 also can check that only data from completed business processes is archived. This data is stored in archive files outside the production database (e.g., database 26) and can then be read from these files at a later date if required.

The system 10 performs archiving using archiving objects. An archiving object is a logical unit that describes which database objects are required to obtain a complete business object for the system 10. The archiving object includes a definition of the logical data units in business processes and all programs required for archiving. For example, these programs can include preprocessing, write, delete, and read programs. The archiving object also includes customized settings. To archive data using the content server 12, the business software 24 reads the selected data from the database 26 and writes it to archive files. During archiving, data can be automatically compressed by, for example, a factor of five. The business software 24 moves the archive files to the content server 12. The content server 12 writes the archive files to a semi-permanent or permanent storage system such as the data storage system 22. The data storage system 22 should guarantee that archived data can be accessed reliably years into the future. The data storage system 22 should also ensure that data to be kept intact is safe from subsequent manipulation. After the archive files are written to the content server 12, the business software 24 has read access to a single data object in a given archived file, or the business software 24 can search data in the archived files via a sequential read.

In a similar manner as the business software 24, the test program 18 is configured to request the content server interface 14 to retrieve a signed URL for formulating HTTP requests for storing, archiving, and retrieving electronic documents by the content server 12. The content server interface 14 authenticates the test program 18, queries the content server 12 for an open port, and returns a signed URL containing the address of the content server 12 and a port identification. Given the address and security key for access to the content server 12, the test program 18 can send commands directly to the content server 12 via the network 16. These commands, described previously, include info, get, docGet, create, mCreate, append, update, delete, search, attrSearch, putCert, serverInfo. For each command, the test program 18 puts the command information along with the address and the security key into an HTTP request and sends the request to the content server 12.

The test program 18 tests the content server 12 under simulated load conditions for a standardized evaluation of the capabilities of the content server 12. The load conditions are intended to reflect a minimal performance capability of the content server 12. Writing and retrieving data to and from the content server 12 in a standardized way generates the load conditions on the content server 12. The test program 18 evaluates the performance of the content server 12 by recording the amounts of time for the writing and retrieving. The test program 18 also can evaluate the performance of the content server 12 by recording how much data can be written or retrieved from the content server 12 in a fixed amount of time. For a rational comparison of these results with standardized criteria, the test program 18 and the business software framework 20 are executed on a computer platform with a fixed performance capability. Furthermore, the content server 12 is executed on a standard computer platform with a fixed performance capability. Similarly, the data storage system 22 has a fixed data retrieval capability.

Figure 2:
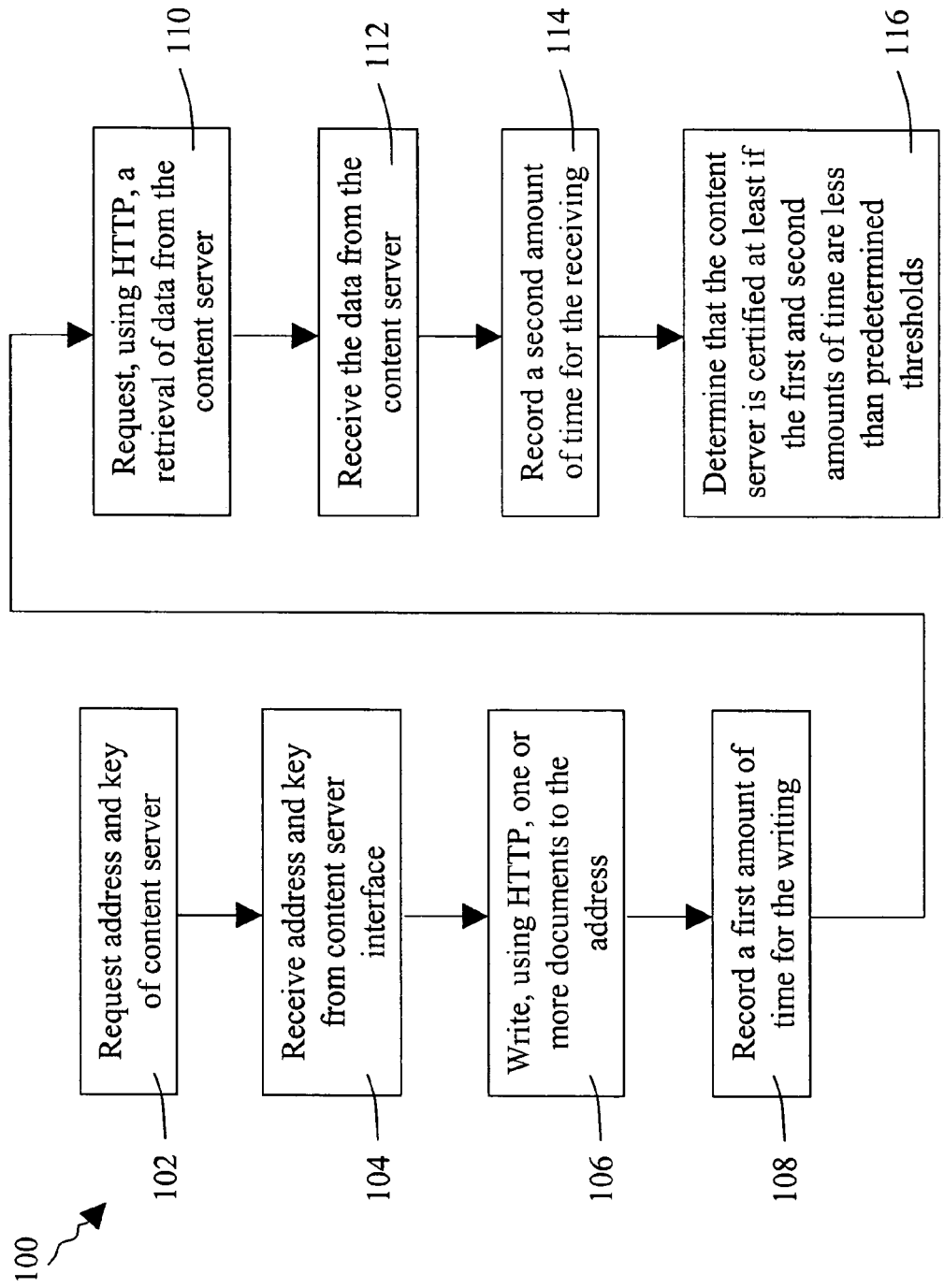
FIG. 2 is a flowchart of a method for certifying a content server.

In general, for the standardized evaluation of the content server 12, referring to FIG. 2, the test program 18 evaluates the performance of the content server 12 using a process 100. The process 100 includes the test program 18 requesting (102) an address of the content server 12 and a security key from the content server interface 14. The process 100 also includes the test program 18 receiving (104) the address and a security key from the content server interface 14. The process 100 also includes the test program 18 writing (106), using HTTP, one or more documents to the address. The process 100 also includes the test program 18 recording (108) a first amount of time for the writing. The process 100 also includes the test program 18 requesting (110), using HTTP, a retrieval of data from the content server. The process 100 also includes the test program 18 receiving (112) the data from the content server. The process 100 also includes the test program 18 recording (114) a second amount of time for the receiving. The process 100 also includes the test program 18 determining (116) that the content server 12 is certified at least if the first and second amounts of time are less than predetermined thresholds.

In one example, the test program 18 evaluates the performance of the content server 12 using the following six tests. The first three tests involve sending documents to the content server 12 to be archived while the second three tests involve reading archived or stored data using the content server 12. The test program 18 records elapsed times associated with the sending and reading. The test program 18 has access to stored thresholds that the test program 18 compares to the elapsed times to determine whether or not the performance of the content server 12 should be certified.

For the first test, the test program 18 tests the performance of the content server 12 while receiving a large print list. For example, first, the test program 18 generates a large print list with 46,000 pages of dummy data, where the data file is at least 500 megabytes large and the description file is at least 7 megabytes. Next, the test program 18 sends a "create" command with a HTTP "POST" request to the content server 12 along with the print list data and description files. The test program 18 records an amount of time in milliseconds from the send until the content server 12 responds with a response indicating that the document was stored in its primary cache. The test program 18 then compares the amount of time with a stored threshold to generate a first report.

For the second test, the test program 18 tests the capability of the content server 12 to store and archive a given number of outgoing documents in a specific time frame without crashing or losing documents. For example, first, the test program 18 generates an outgoing file with a size of at least twenty kilobytes. This twenty kilobytes size reflects a memory requirement to store a typical one page invoice. Next, the test program 18 sends the outgoing file to the content server 12 using a "create" command with a HTTP "PUT" request. The test program 18 starts a timer after this initial send. Next, the test program 18 waits until the content server 12 responds with a response indicating that the document was stored on the primary cache of the content server 12. Then the test program 18 again sends the outgoing document to the content server 12 using a "create" command with a HTTP "PUT" request to store a second copy of the outgoing file. The test program 18 repeats this sending until the timer reaches one hour or 3600 milliseconds. The test program 18 then compares the number of "created"

responses received from the content server 12 with a stored threshold to generate a second report.

For the third test, the test program 18 tests the capability of the content server 12 to receive sixteen outgoing files simultaneously and tests the capability to do this in a fairly amount of time without crashing or losing data. For example, first, the test program 18 generates fifteen outgoing files each with a size of at least one hundred megabytes and a sixteenth outgoing file with a size of at least thirty megabytes from data in the database 26. This dummy data can be derived from flight booking data in the database 26 for airline codes from AA to ZZ (e.g. AA=American Airlines®, LH=Lufthansa®, UA=United Airlines®). In this example the flight booking data includes more than 1,400,000 data entries that can be stored in the fifteen files each with one hundred megabytes and the rest of the data entries can be stored in the sixteenth file of about thirty megabytes.

Next, the test program 18 generates sixteen background processes for sending the sixteen outgoing files to the content server 12 simultaneously. The test program 18 starts a timer. Each background process sends its outgoing file to the content server 12 using a "create" command with a HTTP "PUT" request. The test program 18 then waits for "created" responses from the content server 12 for each of the sixteen background processes. Subsequently, the test program 18 stops the timer and records the elapsed time. The test program 18 then compares the elapsed time with a stored threshold to generate a third report. At a subsequent time, the content server 12 archives the sixteen outgoing documents on the data storage system 22.

For the fourth test, the test program 18 requests a search of data sections on a large print list archived on the data storage system 22 and measures the average time needed to retrieve search data using the content server 12. For example, the test program 18 starts a timer and then sends three "attrSearch" commands with the HTTP "GET" request to the content server 12, specifying the at least five hundred megabyte print list (with forty six thousand pages) previously archived in the data storage system 22 during the first test. The first "attrSearch" command searches for a particular text within a first section of the print list, e.g., page 2000. For example, a particular text can be attribute values with a large byte offset such as 132,615. The second "attrSearch" command searches for the particular text within a second section of the print list, e.g., page 22,700. The third "attrSearch" command searches for the particular text within a third section of the print list, e.g., page 45,700. After three "OK" responses to these commands are received by the test program 18 from the content server 12, the test program 18 stops the timer and records the elapsed time. The test program 18 then compares the elapsed time to a stored threshold to generate a fourth report.

The fifth test tests the performance of the content server 12 if multiple front-end clients (e.g., clients 28 and 30) simultaneously access the same documents archived on the content server 12. For example, the test program 18 requests the content server interface 14 for a signed URL for formulating HTTP requests for storing, archiving, and retrieving electronic documents by the content server 12. Next, the content server interface 14 authenticates the test program 18, queries the content server 12 for open ports, and returns a signed URL containing the address of the content server 12, a port identification, and a security key. The test program 18 then archives ten outgoing files of at least twenty kilobytes each on the content server 12 using the "create" command. Next, the test program 18 launches five client programs (i.e., clients) on five different computers. The five client programs are configured to retrieve the ten outgoing files from the content server 12 using the "docGet" command via the network 16. In some examples, the five client programs are Java programs.

The test program 18 sets a semaphore to a value representing a "wait" state. The five clients started on the five computers first read the semaphore and stay in a polling state as long the semaphore remains in the "wait" state. When the test program 18 detects that all five clients are started and are waiting, the test program sets the value of the semaphore from "wait" to "go". When the clients detect the state of the semaphore to be "go", the clients start simultaneously requesting retrievals of the outgoing files previously stored on the content server 12. Each of the five clients simultaneously starts a timer and sends "docGet" commands using HTTP "GET" requests to the content server 12, specifying the ten outgoing files.

After sending each "docGet" command, each client waits until an "OK" and the data for the file is received before sending the next "docGet" command. This step is repeated ten times. For each client, when the one hundredth "OK" response is received from the content server 12, the client stops its timer and records the elapsed time. The test program 18 averages the elapsed times from the five clients, resulting in an average time that the test program 18 compares to a stored threshold to generate a fifth report. In some examples, this fifth test is performed while the ten documents are in the primary cache of the content server 12, rather than in the secondary cache (data storage system 22).

For the sixth test, the test program 18 tests the time needed for the content server 12 to search randomly in files archived in the data storage system 22 for specific business objects. For example, the test program 18 can measure the time needed for the content server 12 to search randomly in the sixteen archived files in the data storage system 22. First, the test program 18 starts a timer. For each archived file, the test program 18 sends a "search" command using a HTTP "GET" request to the content server 12 specifying a searchable text string. After the content server 12 responds with an "OK" response, the test program 18 sends another "search" command using a HTTP "GET" request to the content server 12 specifying the searchable text string. After the sixteen searches are completed, the content server 12 stops the timer and records the elapsed time. The test program 18 compares the elapsed time to a stored threshold to generate a sixth report.

The six reports generated by the test program 18 can be used to determine if the content server 12 should be certified to operate within the set of performance criteria established by the stored thresholds. In examples where a first vendor provides the business software framework 20 and a second vendor provides the content server 12, these six reports enable the first vendor to choose a vendor for the content server 12 based on the performance of the vendor's content server.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A method for certifying a performance of a content server using a content server interface, the method comprising:
    requesting, by a test program, an address of the content server and a security key from the content server interface;
    receiving the address and the security key from the content server interface;
    evaluating a read performance of the context server, further comprising:
        writing one or more documents to the address using hyper text transfer protocol (HTTP); and
        recording a first amount of time for the writing;
    requesting a retrieval of data from the content server using HTTP;
    evaluating a write performance of the context server, further comprising:
        receiving the data from the content server; and
        recording a second amount of time for the receiving; and
    certifying the content server if the first and second amounts of time are less than predetermined thresholds.

2. The method of claim 1 wherein the one document is a print list.

3. The method of claim 1 further comprising
    requesting a search and retrieval by the content server in a stored print list for one or more data items;
    recording an amount of time to complete the search and retrieval; and
    determining that the content server is certified at least if the amount of time is less than a predetermined threshold.

4. The method of claim 1 further comprising:
    writing one or more documents to the content server until a predetermined time period's duration expires;
    recording a number of the documents successfully written; and
    determining that the content server is certified at least if the number of the documents successfully written exceeds a threshold.

5. The method of claim 1 wherein writing one or more documents to the address comprises simultaneously writing a plurality of files to the content server.

6. The method of claim 1 further comprising:
    requesting, from two or more clients, one or more simultaneous retrievals of a single document from documents stored on the content server;
    recording an amount of time to complete the one or more retrievals for each of the two or more clients; and
    determining that the content server is certified at least if the amount of time is less than a predetermined threshold.

7. The method of claim 6 wherein the stored documents are in a file cache memory of the content server.

8. The method of claim 6 wherein the stored documents are saved on a long term data storage device.

9. The method of claim 8 wherein the data storage device is an optical data storage device.

10. The computer program product of claim 6 wherein the stored documents are saved on a long term data storage device.

11. The computer program product of claim 10 wherein the data storage device is an optical data storage device.

12. The method of claim 1 further comprising:
    requesting, by the test program, a search and retrieval for a data item in data archive files stored by the content server;
    recording an amount of time to complete the search and retrieval; and
    determining that the content server is certified at least if the amount of time is less than a predetermined threshold.

13. The method of claim 1 further comprising generating the one or more documents.

14. A computer program product, recorded on a machine readable medium an information carrier, for certifying a performance of a content server using a content server interface, the computer program product being operable to cause a data processing apparatus to: request an address of the content server and a security key from the content server interface; receive the address and the security key from the content server interface; evaluate a write performance of the context server by: writing one or more documents to the address using HTTP; and recording a first amount of time for the writing; request a retrieval of data from the content server using HTTP; evaluate a read performance of the context server by: receiving the data from the content server; and record recording a second amount of time for the receiving; and certify the content server if the first and second amounts of time are less than predetermined thresholds.

15. The computer program product of claim 14 wherein the one document is a print list.

16. The computer program product of claim 14, wherein the computer program product is operable to further cause a data processing apparatus to:
   request a search and retrieval by the content server in a stored print list for one or more data items;
   record an amount of time to complete the search and retrieval; and
   determine that the content server is certified at least if the amount of time is less than a predetermined threshold.

17. The computer program product of claim 14, wherein the computer program product is operable to further cause a data processing apparatus to:
   write one or more documents to the content server until a predetermined time period's duration expires;
   record a number of the documents successfully written; and
   determine that the content server is certified at least if the number of the documents successfully written exceeds a threshold.

18. The computer program product of claim 14 wherein writing one or more documents to the address comprises simultaneously writing a plurality of files to the content server.

19. The computer program product of claim 14 wherein the computer program product is operable to further cause a data processing apparatus to:
   request, from two or more clients, one or more simultaneous retrievals of a single document from documents stored on the content server;
   record an amount of time to complete the one or more retrievals for each of the two or more clients; and
   determine that the content server is certified at least if the amount of time is less than a predetermined threshold.

20. The computer program product of claim 19 wherein the stored documents are in a file cache memory of the content server.

21. The computer program product of claim 14 wherein the computer program product is operable to further cause a data processing apparatus to:
   request a search and retrieval for a data item in data archive files stored by the content server;
   record an amount of time to complete the search and retrieval; and
   determine that the content server is certified at least if the amount of time is less than a predetermined threshold.

22. The computer program product of claim 14 wherein the computer program product is operable to further cause a data processing apparatus to generate the one or more documents.

23. The system of claim 14 wherein the one document is a print list.

24. The system of claim 14, wherein the test program is further configured to:
   request a search and retrieval by the content server in a stored print list for one or more data items;
   record an amount of time to complete the search and retrieval; and
   determine that the content server is certified at least if the amount of time is less than a predetermined threshold.

25. A system for certifying a performance of a content server using a content server interface, the system comprising:
   a test program;
   a network configured to enable communication between the test program, the content server, and the content server interface; and
   wherein the test program is configured to:
      request an address of the content server and a security key from the content server interface;
      receive the address and the security key from the content server interface;
      evaluate a write performance of the context server by:
         writing one or more documents to the content server at the address using HTTP; and
         recording a first amount of time for the write;
      request, using HTTP, a retrieval of data from the content server;
      evaluate a read performance of the context server by:
         receiving, from the content server, the data; and
         recording a second amount of time for the receive; and
      certify the content server at least if the first and second amounts of time are less than predetermined thresholds.

26. The system of claim 25, wherein the test program is further configured to:
   write one or more documents to the content server until a predetermined time period's duration expires;
   record a number of the documents successfully written; and
   determine that the content server is certified at least if the number of the documents successfully written exceeds a threshold.

27. The system of claim 25 wherein writing one or more documents to the address comprises simultaneously writing a plurality of files to the content server.

28. The system of claim 25 wherein the test program is further configured to:
   request, from two or more clients, one or more simultaneous retrievals of a single document from documents stored on the content server;
   record an amount of time to complete the one or more retrievals for each of the two or more clients; and
   determine that the content server is certified at least if the amount of time is less than a predetermined threshold.

29. The system of claim 28 wherein the stored documents are in a file cache memory of the content server.

30. The system of claim 28 wherein the stored documents are saved on a long term data storage device.

31. The system of claim 30 wherein the data storage device is an optical data storage device.

32. The system of claim 25 wherein the test program is further configured to:
  request a search and retrieval for a data item in data archive files stored by the content server;
  record an amount of time to complete the search and retrieval; and determine that the content server is certified at least if the amount of time is less than a predetermined threshold.

33. The system of claim 25 wherein the test program is further configured to generate the one or more documents.

* * * * *